US009819950B2

(12) United States Patent
Boles et al.

(10) Patent No.: US 9,819,950 B2
(45) Date of Patent: Nov. 14, 2017

(54) HARDWARE-ADAPTABLE WATERMARK SYSTEMS

(71) Applicant: Digimarc Corporation, Beaverton, OR (US)

(72) Inventors: Jacob L. Boles, Portland, OR (US);
Ravi K. Sharma, Portland, OR (US);
John D. Lord, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 16 days.

(21) Appl. No.: 14/842,575

(22) Filed: Sep. 1, 2015

(65) Prior Publication Data

US 2017/0004597 A1   Jan. 5, 2017

Related U.S. Application Data

(60) Provisional application No. 62/188,440, filed on Jul. 2, 2015, provisional application No. 62/196,876, filed on Jul. 24, 2015.

(51) Int. Cl.
| | |
|---|---|
| *G06K 9/00* | (2006.01) |
| *H04N 19/42* | (2014.01) |
| *G06T 1/00* | (2006.01) |
| *G06K 7/10* | (2006.01) |

(52) U.S. Cl.
CPC ........... *H04N 19/42* (2014.11); *G06T 1/0064* (2013.01); *G06T 2200/28* (2013.01); *G06T 2201/0065* (2013.01)

(58) Field of Classification Search
USPC ....... 382/100, 103, 162, 168, 173, 181, 232, 382/235, 243, 254, 276, 286–287, 305; 704/500; 713/176; 235/468
See application file for complete search history.

(56) References Cited

U.S. PATENT DOCUMENTS

| | | | |
|---|---|---|---|
| 6,590,996 B1 * | 7/2003 | Reed | G06T 1/0021 235/468 |
| 7,370,190 B2 | 5/2008 | Calhoon et al. | |
| 8,027,507 B2 * | 9/2011 | Levy | G06T 1/0028 382/100 |
| 8,719,958 B2 | 5/2014 | Levy | |

(Continued)

*Primary Examiner* — Seyed Azarian
(74) *Attorney, Agent, or Firm* — Digimarc Corporation

(57) ABSTRACT

There are many advantages to implementing a watermark-based system using dedicated hardware, rather than using software executing on a general purpose processor. These include higher speed and lower power consumption. However, hardware implementations incur substantial design and development costs. Moreover, because each watermarking application has its own design constraints and parameters, it has not been cost-effective to develop a hardware chip design for each, since such chips would typically not be manufactured in volumes sufficient to bring per-unit costs down to an acceptable level. The present technology provides various techniques for making watermarking hardware adaptable, so that a single chip can serve multiple diverse watermark applications. By so-doing, the advantages of hardware implementation are made available where it was formerly cost-prohibitive, thereby enhancing operation of a great variety of watermark-based systems.

25 Claims, 7 Drawing Sheets

(56) References Cited

U.S. PATENT DOCUMENTS

| | | | |
|---|---|---|---|
| 8,891,811 B2 | 11/2014 | Alattar et al. | |
| 2003/0231785 A1* | 12/2003 | Rhoads | G06F 17/30876 |
| | | | 382/100 |
| 2006/0200672 A1* | 9/2006 | Calhoon | G06F 21/16 |
| | | | 713/176 |
| 2011/0212717 A1 | 9/2011 | Rhoads et al. | |
| 2012/0078989 A1 | 3/2012 | Sharma et al. | |
| 2014/0108020 A1* | 4/2014 | Sharma | G10L 19/018 |
| | | | 704/500 |
| 2015/0242120 A1 | 8/2015 | Rodriguez | |

\* cited by examiner

HARDWARE-ADAPTABLE WATERMARK SYSTEMS

RELATED APPLICATION DATA

This application claims priority to pending provisional applications 62/188,440, filed Jul. 2, 2015, and 62/196,876, filed Jul. 24, 2015, the disclosures of which are incorporated herein by reference, in their entireties.

TECHNICAL FIELD

The present technology concerns improvements to the design and operation of digital watermark systems.

INTRODUCTION

Digital watermark systems are detailed in a variety of applicant's previously-published documents, including U.S. Pat. Nos. 6,590,996 and 8,886,206, and application 20120078989, the disclosures of which are incorporated herein by reference.

For clarity of description, the present discussion focuses on arrangements that decode watermark-encoded data from imagery. However, the same principles are likewise applicable to systems that perform the complimentary predecessor operation, namely encoding watermark data into imagery.

FIG. 1 shows basic elements of an exemplary watermark decoding system 10. Imagery is input first to an image standardization stage 12. This stage executes a series of operations to transform the input imagery into a form expected by succeeding stages. These operations can involve operations such as color conversion, filtering, and resampling/interpolation.

In an exemplary embodiment, the input imagery is a high resolution (e.g., 600 or 1200 dots per inch) RGB color image. Standardization stage 12 first converts this imagery into an 8-bit greyscale counterpart, and then down-converts the greyscale image to a resolution of 300 dots per inch. A representative down-conversion process can involve, e.g., applying a 2×2 averaging filter and a 2:1 decimation operation to reduce the image size, followed by finite impulse response filtering for anti-aliasing, followed by interpolation and sub-sampling.

The next stage 14 performs a synchronization operation.

When watermark data was earlier encoded into host imagery, it had a known scale, orientation, and position. For example, the watermark data may have been encoded into square signal blocks of 128×128 pixels, at a resolution of 300 dpi. (This yields a block of about 0.4267 inches on a side.) Multiple such blocks may have been tiled across the object being watermarked (e.g., a cereal box) starting in the upper left corner.

When an image of such a watermarked object is captured by a camera, however, nothing is known about the scale, rotation, or position of the watermark blocks within the captured imagery. The synchronization stage 14 sleuths these parameters, which are then used by the decoding stage 16 to extract the watermarked data.

This sleuthing proceeds by reference to certain reference signals included in the watermark signal. These reference signals define a constellation of component impulses (sinusoids), of pseudo-random phase, and of pre-determined pattern, in the spatial frequency domain. This known pattern enables the watermark detector to discern how the image submitted for decoding has been geometrically transformed since it was originally encoded. For example, the reference signal enables the detector to discern an amount by which the image has been shifted in X- and Y-directions (translation), an amount by which it has been changed in scale, and an amount by which it has been rotated. Other affine transform parameters (e.g., shear and differential x/y scaling) can also be determined.

FIGS. 2 and 3 detail some of the inner-workings of an exemplary synchronization stage 14. These drawings are copied from published application 20120078989. (The last block of FIG. 2 is repeated as the first block of FIG. 3.) The reader is referred to the full text of that document for a detailed description of exemplary synchronization operations.

Following operation of synchronization stage 14, the system knows the scale, rotation, translation, shear and differential scaling of the watermark blocks within the imagery. (FIG. 4 shows these various affine transforms, by comparing an original watermark block, with illustrative scale-, rotation-, translation-, and shear-transformed counterparts.) With such knowledge about the representation of the watermarked block within the imagery, the decoder stage 16 can identify and decode the data payload conveyed by the watermarked block. (This may involve, as a preliminary operation, applying corrective scale-, rotation-, translation-, shear- and differential scaling-transforms to restore the watermarked block to its original configuration.)

Decoding commonly includes two processes. The first demodulates the raw data bits conveyed by the image, using a spatial spreading signal by which they were earlier modulated. These bits typically number several hundred, having been redundantly encoded by a forward error correction process, such as Turbo, Convolutional, or Reed Solomon coding. The second process takes the hundreds of raw bits and determines the smaller number of payload bits (e.g., 48) represented by the forward error correction coding. An exemplary decoding process is further detailed in U.S. Pat. No. 6,590,996.

In the prior art, watermark decoding systems were purpose-built. For example, one system may have been designed to decode a watermark that conveys a payload of 76 bits, encoded using a certain spreading signal, represented in blocks of 256×256 pixels, at 600 DPI, etc., etc. Another may have been designed to decode a watermark that conveys a payload of 48 bits, encoding using a different spreading signal, represented in blocks of 128×128 pixels, at 300 DPI, etc., etc. Moreover, different watermark systems were tailored to different application scenarios.

For instance, at a supermarket checkout—where a point of sale (POS) scanner may generate 80 frames of imagery per second from a product passing by the scanner, extraction of watermarked product IDs from resultant imagery must be performed in a dozen milliseconds or less. In contrast, when a shopper uses a smartphone app to access nutritional information for the same product on a store shelf, via the same watermark, a decoding interval of 100 milliseconds may be acceptable. But this latter application may have different challenges, such as uncertainty regarding the intensity and spectrum of the lighting that illuminates the package, and/or a greater variability in the focal distance. In still other applications, such as a counter-top terminal for age verification at a liquor store that reads digitally-watermarked birth date data from a shopper's driver license, the watermark signal may have been degraded by many years of wear and tear in the shopper's wallet. So ability to successfully extract watermarked information from corrupted media is sometimes important. Each application thus presents its own set of priorities and constraints.

Most watermarking systems are implemented in software, executing on a general purpose CPU, such as an Intel i7, or an ARM processor. But certain advantages accrue from hardware implementations, such as by application specific integrated circuits (ASICs). One such advantage is speed. Another can be lower power consumption. Another can be to enhance security against tampering and other hacking.

However, hardware implementations have their own drawbacks, including substantial design and development costs. Since each application has its own design constraints and parameters, it has generally not been cost-effective to develop a hardware design for each, because such parts would typically not be manufactured in sufficient volume to bring per-unit costs down to an acceptable level.

In accordance with one aspect of the present technology, a digital watermark system is implemented in hardware, but in a fashion that enables it to be reconfigured to meet different constraints. By such arrangement, a single piece of silicon can serve many diverse applications. This enables such hardware to be manufactured in sufficient volumes to bring down per-unit costs. This, in turn, provides the advantages of hardware implementation to applications where it would otherwise have been cost-prohibitive, thereby enhancing operation of a great variety of watermark-based systems.

The foregoing and additional features and advantages of the present technology will be more readily apparent from the following detailed description, which proceeds with reference to the accompanying drawings.

DETAILED DESCRIPTION

Applicant details, below, several different forms by which watermark systems can be made reconfigurable in hardware.

Figure 5:
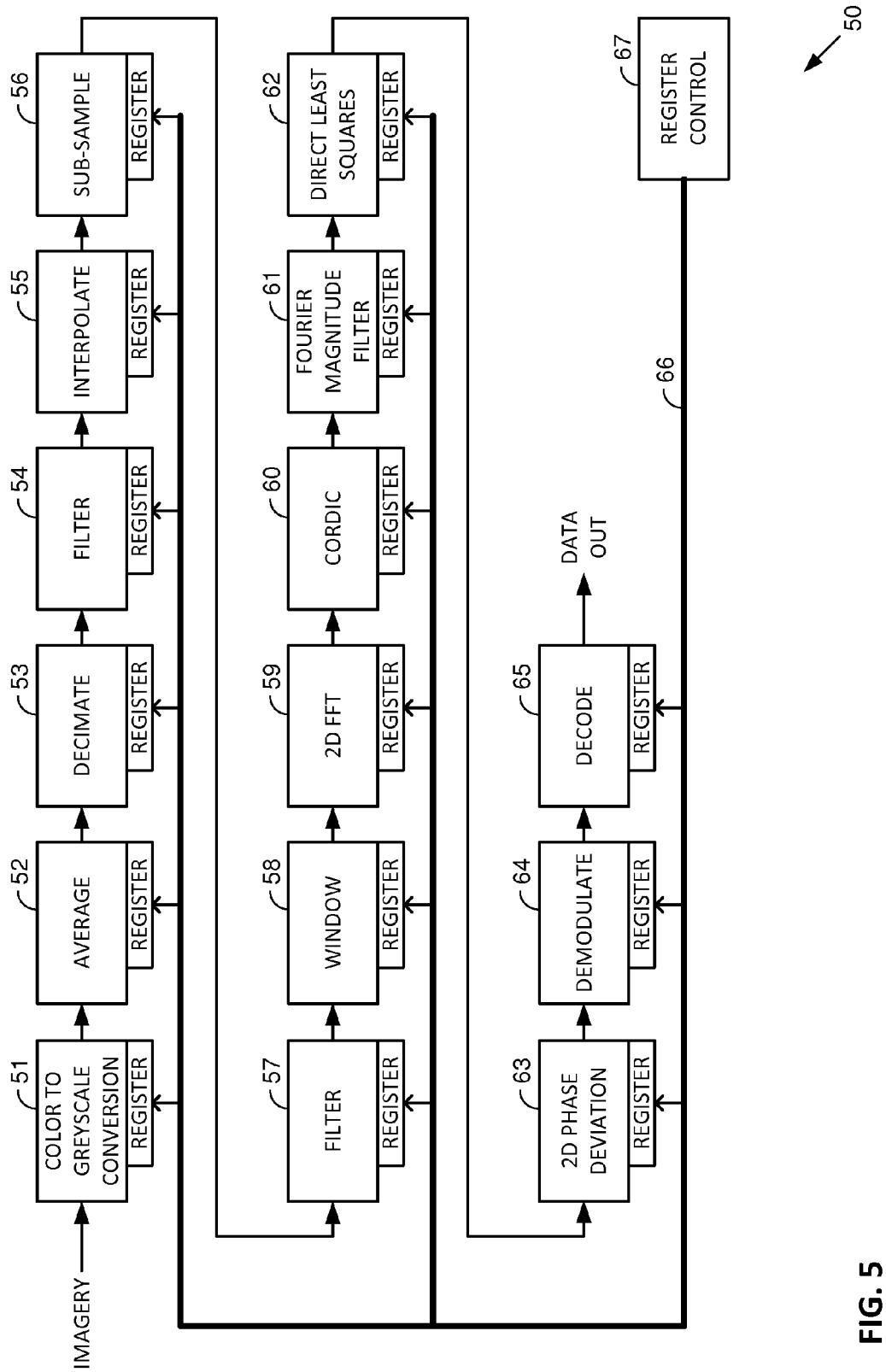
FIG. 5 details a particular reconfigurable hardware arrangement using a parametric reprogrammable design.

FIG. 5 shows a first such hardware system 50. This arrangement includes the image standardization, synchronization, and decoding stages of FIG. 1, but depicted in greater detail. Each such stage is implemented as a pipelined series of modules, each of which performs a different part of the overall process.

Some or all of these modules are implemented in ASIC form, e.g., using known techniques as detailed below. But, importantly, at least one or more of the modules includes one or more registers into which parameter(s) that tailor some aspect of the module's operation are stored. If the hardware system 50 is employed in a retail, fixed POS scanner, one set of parameters can be employed. If employed in a handheld scanner, another set of parameters can be employed. If employed in a consumer smartphone, still another set of parameters can be employed. If employed in a counter-top age verification device, yet another set of parameters can be employed. Etc.

In an exemplary embodiment, a bus 66 connects the register(s) to a register control circuit 67. The bus can be, e.g., a bus according to the Advanced Microcontroller Bus Architecture (AMBA) Advanced eXtensible Interface (AXI) standard. The control circuit can be a microcontroller. The microcontroller writes data into the module register(s), based on a configuration file, or based on data held in a ROM (or in RAM, or via DMA from a memory system bus, etc.).

To illustrate, the color to greyscale module 51 can be parameterized differently to apply different conversion techniques.

One form of conversion seeks to preserve the local and overall luminance of the image using a so-called colorimetric conversion. One such conversion weights the values of red, green and blue pixel values by factors of 0.2126, 0.7152, and 0.0722, respectively, and then sums, to yield a greyscale value. These three factors may be stored in registers associated with module 51. Such arrangement may be suitable, e.g., for use with imagery that is captured with natural light. A retail POS scanner, in contrast, may capture imagery under strong red illumination. For such a scanner, greyscale conversion may simply involve discarding the green- and blue-channel data, and using the values of the red pixels as greyscale values. In this case the three factors noted above would be 1.0, 0 and 0.

Figure 6:
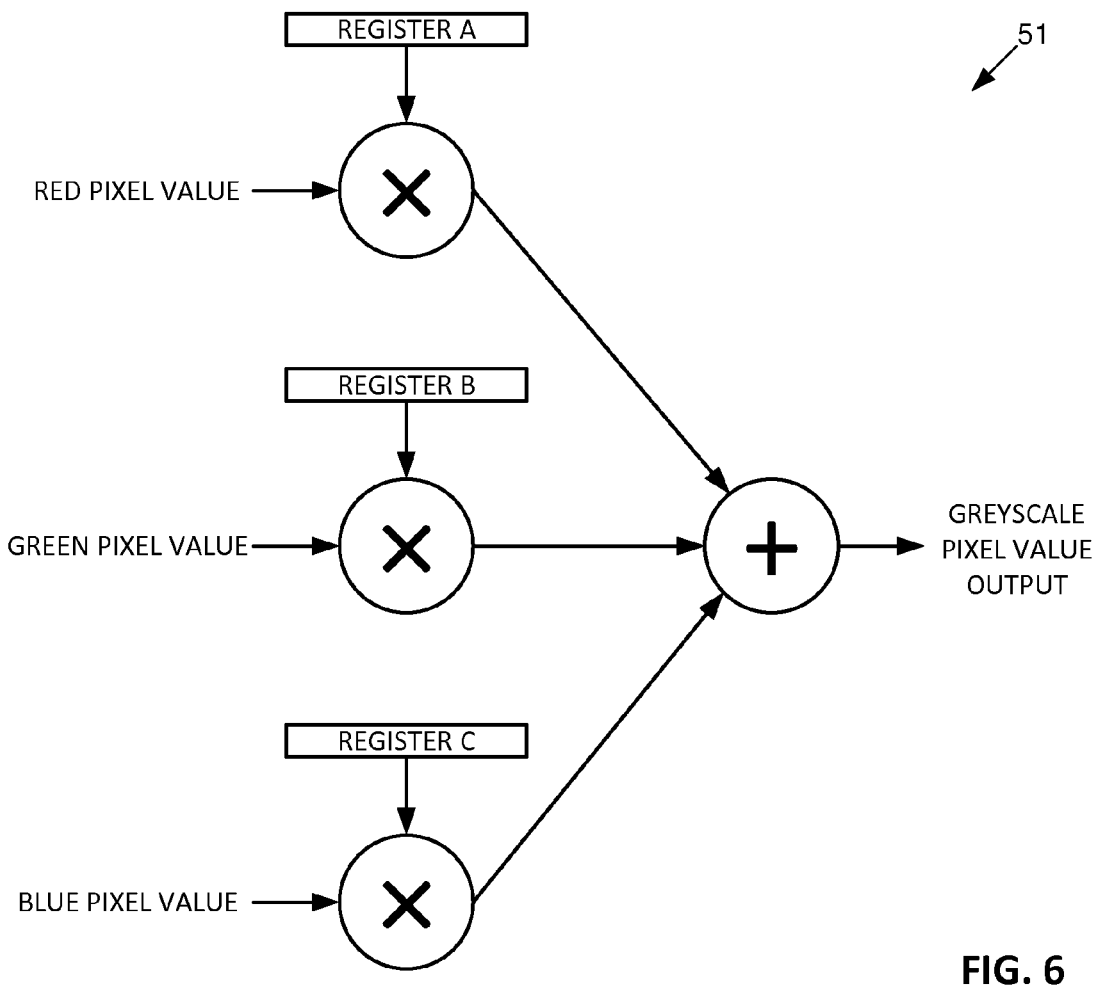
FIGS. 6 and 7 show block diagrams of an illustrative module 51 from the FIG. 5 embodiment.

FIG. 6 is a block diagram of circuitry that can be incorporated into such a module 51, to make use of three factors, stored in three registers: A, B and C.

Module 51 may further be arranged to permit certain image contrast adjustments to the greyscale imagery, in response to one or more flag bits stored in registers. For example, setting a first flag bit to 1 may trigger module 51 to apply a first type of contrast adjustment—adjusting the greyscale pixel values so as to set the darkest pixel value to 0, and linearly scaling intermediate values accordingly. If the original greyscale pixel values range from 80 to 200, setting this first flag bit causes the module 51 to further process the pixel values so they range from 0 to 200. This can be done by subtracting the lowest pixel value, i.e., 80, from each greyscale value, and then multiplying the result by a gain factor k=200/(200−80).

Figure 7:
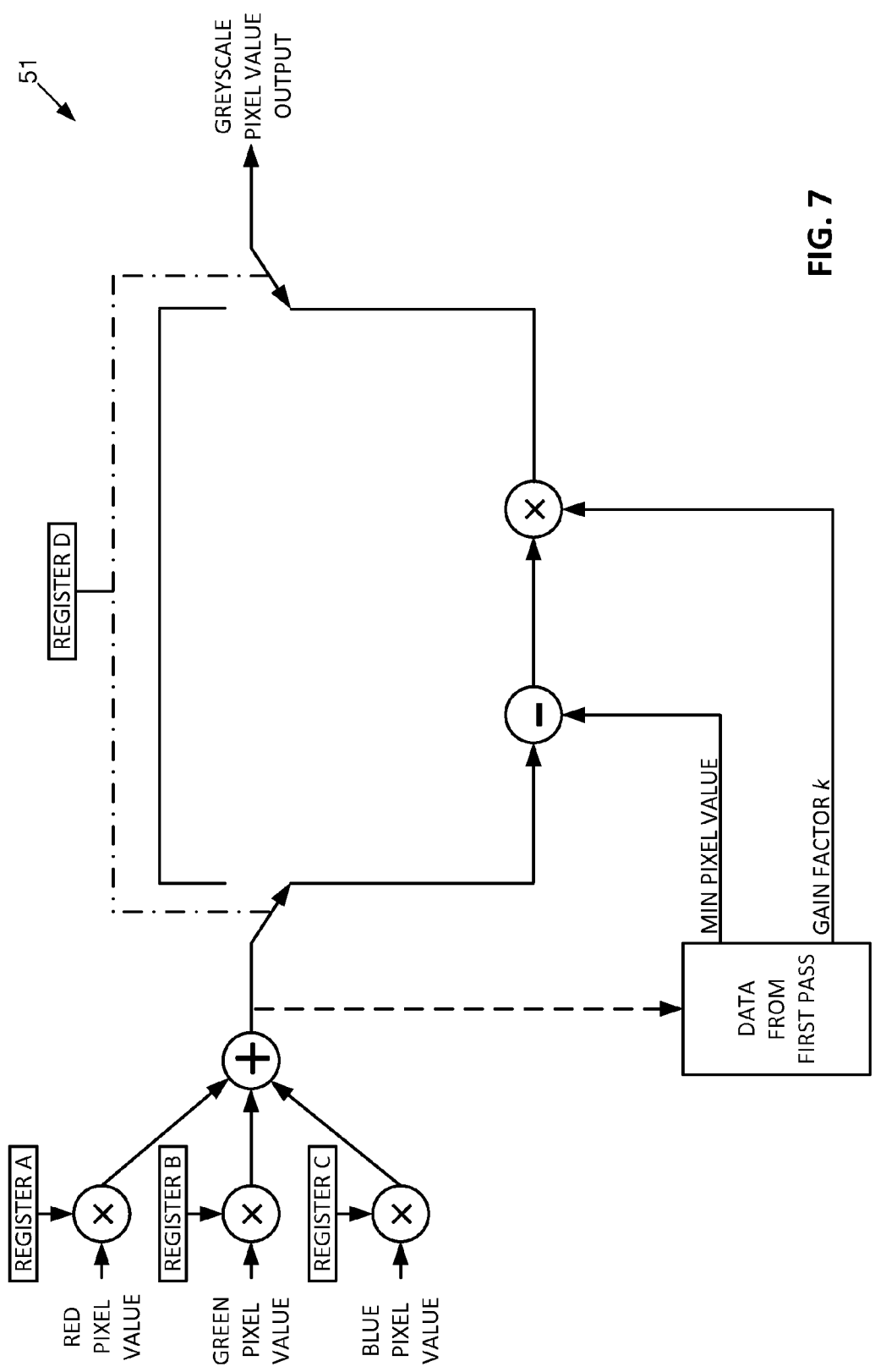

FIG. 7 is a functional block diagram of the circuitry of FIG. 6, further adapted to respond to this first flag bit (which is stored in a fourth register, D). A switch system responds to the value stored in register D. If a value of "1" is stored, the switch system causes the greyscale value to be routed to further circuitry that performs the just-described contrast adjustment. If a value of "0" is stored in register D, the switch system bypasses this further circuitry.

(Determining the maximum and minimum greyscale pixel values in the frame of imagery is determined, in a preliminary pass through the data, using a 256 bit memory. The 256 address locations correspond to the 256 possible greyscale values. Each greyscale pixel value in the image is used to set a corresponding bit location in the memory to "1." The highest memory address that stores a "1" corresponds to the maximum greyscale value in the image. Similarly, the lowest memory address that stores a "1" corresponds to the minimum greyscale value in the image. After the image has been processed in this fashion, a difference between the largest and smallest pixel values is computed—either by a dedicated logic circuit, or by programmable logic, not shown. So, too, with the gain factor k. These values can be stored in registers, and applied in the rescaling operation described above.)

In this same, or another, embodiment, a further register value triggers a different contrast adjustment—adjusting the greyscale pixel values so as to set the lightest pixel value to 255, and linearly scaling intermediate values accordingly. For example, if the range of greyscale pixel values ranges from 80 to 200, setting this further flag bit will cause the module to further process the pixel values so they range from 80 to 255. (It will be recognized that this can be done by subtracting 80 from each pixel value, multiplying by a gain factor (255−80)/(200−80), and then adding 80 to the result.)

In a module 51 that includes both types of contrast adjustment circuitry, setting both flag bits (e.g., in register D and in a register E) causes the module 51 to output greyscale values ranging from 0 to 255.

Still other parameters can compensate the image data before conversion into greyscale. While CCD and CMOS image sensors are generally linear (twice the light equals twice the signal), sometimes the raw sensor data is not available for processing. Instead, the camera may apply certain image processing steps to the pixel before making it available to external systems. This can include color "correction" and gamma processing. While such processing is often desirable for imagery to be presented to human viewers, such processing can be detrimental when seeking to recover subtle digital watermark signals. (For example, it may adjust one or more colors by different amounts, or it may result in non-linear scaling.) Accordingly, further parameters stored in the registers of module 51 can detail a mapping process that specifies—for certain values of input data (e.g., certain triples of RGB data), a counter-compensated value that un-does the "correction" applied by the camera system. (The module can apply interpolated correction values between the specified values.)

The foregoing illustrate the diversity of parameters that can be employed to tailor the operation of the greyscale conversion module 51. A great number of other parameters can similarly be employed.

Module 52 in FIG. 5 performs an averaging function, as part of the image standardization stage. Among the parameters stored in its associated register(s) is a specification of the size of pixel sub-block that should be averaged. A reduction in pixel count by a factor of four can be realized by data in this register specifying use of a 2×2 pixel sub-block. A reduction by a factor of nine can be realized by data in this register specifying use of a 3×3 pixel block. Such selections also influence the low-pass filtering characteristics introduced by the averaging module 52.

The decimation module 53 similarly operates according to register data, e.g., identifying the integer or real value by which the image data from module 52 is to be further decimated.

In the detailed arrangement, filter module 54 applies a finite impulse response filter to the decimated data from module 53. This module can be characterized by register data specifying, e.g., the number of taps (stages) in the filter, and the coefficient value for each stage.

One or more of the modules 52-56, or another module, can also operate to deal with unknown scale of a depicted object within the image data. For example, if the image data is captured by a supermarket POS camera, the distance between the object and the camera is unknown. The reduction of image resolution by, e.g., modules 52 and 53, must not over-reduce this image resolution below that from which a watermark can be recovered, but should reduce it enough to discard surplus image data and bring the watermark into a useful range of scale that the watermark detector can handle. Thus, one or more of the stages 52, 53, 54, 55, 56 can be adjusted dynamically in hardware to best match the image captured by the camera, to the watermark detection scale range. This dynamic adjustment can utilize a scale factor determined from one or more previously-successful watermark reading operations, reasoning that the scanner-item distance of the present item is similar to that of the scanner-item distance for a previous item (e.g., an immediately-preceding item). Such scale information can be stored in a register during the previous watermark decoding operation, and recalled in the present watermark decoding operation. (This illustrates a features of the technology wherein the configurability of the system needn't be limited to configuration based on user- or designer-selected parameters, but can also be auto-configured, e.g., learning from its previous operation.)

Alternatively, the module(s) can perform trial decodes on some or all of a frame of imagery, assuming two or three different camera-object distances, to identify which of the assumed distances enables a watermark to be detected. The distance that is found best-suitable in decoding a watermark signal is stored, and governs operation of the system for a next phase of its operation. (This is another example of hardware reconfigurability based on data discovered by the system during its operation, rather than input by a system designer or user.)

In still other arrangements, one or more ranging sensors can write range information (e.g., obtained by stereo image triangulation or the like) into a hardware register, from which one or more of the modules employs it to adjust the scale of the image to one at which an encoded watermark can be decoded. (This is another example of the hardware system reconfiguring itself based on data the system senses.)

Figure 1:
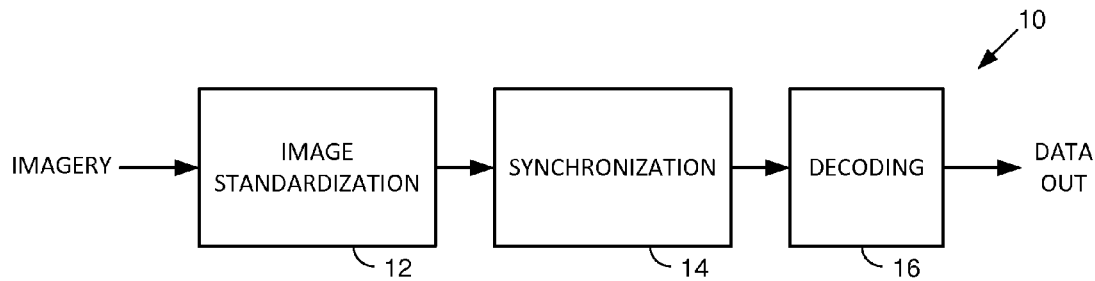
FIG. 1 is a basic block diagram of a watermark decoding system.

The synchronization performed by module 14 of FIG. 1 may be conceptualized as including the hardware circuitry 57-63 of FIG. 5. The filter module 57 performs an oct-axis operation, corresponding to block 300 in FIG. 2. Each pixel value is compared with its eight neighbors, and is replaced by a value that is a function of these comparisons. This non-linear filtering de-correlates the watermark signal from the host image data, and serves to predict whether the pixel value represents an embedded one or zero (or other message symbol).

One particular implementation compares the value of a pixel with values for each of its neighbors, adding a "1" if the neighbor value is less, and subtracting a "1" if the neighbor value is more. The net result (ranging from −8 to 8) is substituted for the pixel value.

Register data in module 57 can serve to define weighting factors for each of these eight comparisons, so they are not treated uniformly. For example, the pixel value's comparison to pixels above/below, and/or right/left, may be weighted more heavily (e.g., with a factor of 1.5, 2 or 3) than a similar comparison to pixels on the diagonal. Alternatively, the comparison to pixels on the diagonal may be given no weight (e.g., a factor of zero in the registers).

In some embodiments, the registers define a look-up table which identifies a filter output value for each of several different combinations of comparison outcomes between the pixel and is neighbors. (In one particular embodiment, each comparison has one of three states: greater-than, less-than, or equal. There are eight such comparisons, yielding 6,561 theoretical states. However, since vertically-adjoining comparisons are often treated identically, and likewise for horizontally-adjoining and diagonally-adjoining, the number of theoretical states can be reduced. For example, a count may be made of how many of the diagonally-adjoining comparisons are greater-than, how many are less-than, and how many are equal to—without regard to which of the four diagonal directions has which comparison state.)

In still other embodiments, the registers of module 57 can cause the module to average the values of pixels above and below the subject pixel, and perform a comparison of that average value with the subject pixel value. Likewise with pixels to the left and right. And likewise with pixels in the four diagonal directions. This yields three comparison outputs—each of which can have any of three values. Again, a look-up table can identify an output value for module 57 for each of the resulting 27 different states.

In yet other embodiments, parameter data in the registers of module 57 indicates that, instead of a 3×3 neighborhood of surrounding pixels (i.e., 8 comparisons), a 5×5 neighborhood (i.e., 24 comparisons)—or another (e.g., a non-square neighborhood)—should be processed instead.

The window module 58 prepares the oct-axis-filtered image data for a 2D FFT. Parameters in the registers of module 58 can comprise samples of the windowing function to be applied to the data. (The window is typically symmetrical, so only half of the windows needs to be characterized.) Alternatively, the register data can serve to index a collection of pre-defined window functions that have native support in the hardware (e.g., various Gaussian, Hanning and Hamming windows), and are simply selected using the corresponding register data. In still other embodiments, the register data define coefficients and exponents of a generalized window function, such as generalized normal window.

Parameter data in the register of 2D FFT module 59 identifies the size of the data set provided as input, and thereby defines the size of the data set provided as output.

The CORDIC module 60 takes the real and imaginary output data from module 59, and converts it into corresponding magnitude and phase values. In many implementations, module 59 has no register; its operation is the same, regardless of the particular application in which the hardware may be employed.

The Fourier Magnitude Filter module 61 performs a non-linear filtering operation, akin to that of oct-axis filter module 57. The output of module 61 depends on a ratio between an input sample value, and the values of its eight neighbors in the Fourier magnitude domain. The parameters stored in the registers of module 61 can vary the weighting given to different ratios, the size of the neighborhood, etc.

The Direct Least Squares module 62 computes and refines various potential linear transform candidates for maximum correlation strength. It operates using seed data, e.g., matrix coefficients defining candidate affine transforms (for instance, defining candidate rotation, scale, differential x/y scale, and shear), which can be stored in the associated registers. Some applications may be characterized by known (or no) differential scale. Likewise for shear. Sometimes, too, for rotation and scale. Or the expected values of rotation and scale may be differently-bounded for different applications. Accordingly, the seed data stored in the registers is chosen based on the particular types, and degrees, of affine transforms expected to be appropriate for the image data encountered during actual operation. The register data can also define how many seeds should be tried, and may define their distribution within a multi-dimensional parameter space.

The register data can also define other parameters for operation of module 62. For example, register data can adapt the system to employ different ones of several alternative signal correlation metrics. (One metric may comprise a sum of a bi-linear interpolation of frequency magnitudes of the four nearest neighbors for each transformed location within a suspect signal. Another metric may use a bi-cubic interpolation using a 3×3 sample region around each transformed frequency component's location. Still another metric can take into account (or rely exclusively on) phase components of reference and suspect signals at several locations.)

The phase deviation module 63 receives each linear transform candidate, and a corresponding set of estimated phases of the reference signal in the suspect signal. This module computes a phase deviation surface for each linear transform candidate. This surface is an array of phase deviations, where each element in the array corresponds to a translation offset, and the value of the element is the sum of phase deviation metrics between corresponding expected and measured phase differences. For 2D phase deviation, this is a 2D array of phase deviation values corresponding to all pairs of translation offsets (e.g., a surface of 128 by 128 values). The phase deviation for a particular translation offset is computed as a sum of a difference metric that calculates a deviation between an expected phased difference and a measured phase difference at a particular reference signal component. In one particular implementation, there are four orientations for each linear transform candidate, corresponding to orientations of 0, 90, 180 and 270 degrees. (Register data can establish a greater or lesser number.)

The object of module 63 is to provide one or more translation offset candidates corresponding to a minima in phase deviation. That is, the object is to find the translation offset that best matches the expected and measured phase differences, as determined by the minimum deviation between the two. Rather than search for a minimum, it is sometimes desirable to subtract the phase deviation from a large constant to convert the problem to one of searching for a maximum (peak) instead (i.e., corresponding to a minimum phase deviation metric in the phase deviation surface).

Register data in module 63 can specify the number of thus-found peaks that are to be further evaluated. For example, this number can range from 2 to 10, or more. For each such peak, the module computes a refined phase deviation surface in a neighborhood around the translation offset corresponding to the peak. These refined phase deviations are computed for sub-pixel translation offsets. In particular, the expected phase differences are computed for each of the sub-pixel translations in an M×M array around the integer translation location of a peak. The value of M, and the fractional (i.e., sub-pixel) increments in translation can be parameters stored in registers of module 63. (Illustrative parameters may be M=16, and the sub-pixel increment=0.25.) The output of module 63 is a linear transform candidate followed by a list of peak coordinates corresponding to minima in the phase deviation surface (including any surfaces computed in this refinement operation).

The decoding performed by module 16 of FIG. 1 may be conceptualized as including the hardware circuitry 64, 65 of FIG. 5. The incorporated-by-reference documents, and application 62/193,479 that is appended to priority application 62/196,876, detail operation of these stages, so such descriptions are not reproduced here. As with the modules associated with synchronization, these modules 64, 65 are parameterized by data stored in registers to tailor their operation to the particular type(s) of watermark(s), and the particular application(s), being served. By way of example and not limitation, the registers can define the spreading signal used to modulate the bits of the watermark payload into the larger number of encoded message bits, and their respective embedding locations; the error correction protocol by which this coding is performed; the metric used to gauge confidence in each of the decoded raw message bits (which can serve as a weighting factor in evaluating these decoded raw message bits); the size of sub-blocks used in establishing signal confidence, etc.

It will be appreciated that some or all of implementation parameters that characterize a particular watermark system can be made to be reconfigurable by use of the register arrangement detailed above (or the further arrangements discussed below). As a small sampling, such parameters can define scaling factors, weighting factors, threshold values, input image dimensions, greyscale image dimensions, watermark block sizes, sub-block sizes, bit depths, filter parameters, a number of trial seeds for iterative-based search methods and different patterns by which seed values can be distributed, image block overlaps, search space/limits (e.g., for watermark transform parameters, e.g., search for possible scaling between 40% and 250%), search steps, kernels, iteration counts, starting points for iterative searches, number of peaks/candidates to be identified, spreading signals/chip signals, specification of one algorithm from among alternatives (e.g., an error correction code selected from one or more of: convolutional codes, turbo codes, block codes, BCH, Reed Solomon; an interpolation technique selected from among several alternatives; a weighting metric selected from among various alternatives; etc.), specification of one pattern of reference signal spatial frequencies from among alternatives (e.g., 52 impulses in one pseudo-random pattern, vs. 44 impulses in a different pseudo-random pattern, etc.), counter and timer values/limits, etc. Some of these register data may be literals; others may be indices or URLs that refer to literal values stored elsewhere (e.g., a particular spreading sequence, or a particular set of filter tap coefficients). It is impractical to give an exhaustive catalog of all the possible parameters, since the parameters are so numerous, and so variable with the range of watermark types and applications that the hardware seeks to serve. The artisan's review of the incorporated-by-reference patent documents will reveal a great many other parameters that advantageously can be made reconfigurable through use of the present technology.

It will be recognized that some parameters are applicable to multiple modules. One example is the watermark block size, in pixels. Other such data comprises the reference signals used in discerning the geometrical transformation of the input image. Still other such data defines the reference frame by which certain metrics are expressed. (For instance, in some implementations, the reference signal phases are expressed relative to Fourier representation block center. In others, they are expressed relative to Fourier representation block corner. Similarly, a translation may be expressed relative to the coordinate system of the reference signal, or to that of a transformed suspect signal.)

In some embodiments, when a parameter is used by multiple stages, it is replicated and stored in a register for each stage. In other embodiments, the parameter(s) is stored in a single register, which is accessible by multiple modules. Or, such parameter(s) is stored in a memory off the ASIC, where it is accessible by those modules that need it.

One or more of the register-stored parameters may be refined, over time, by a Bayesian statistical update procedure. For example, one or more parameters may be slightly adjusted in a particular direction, and aggregate statistical results of the detection system are then considered over an extended period (e.g., processing hundreds or more image frame, and examining message symbol reliability statistics) to determine whether the adjustment was beneficial or not. If so, a further adjustment of those parameter(s) in that particular direction can be tried; else, those parameters can revert to their former values, and adjustment of one or more other parameters can be tried.

It will be recognized that some of the modules are described as operating on single pixels, while others may require access to a full frame of imagery to operate. Still others operate on intermediate chunks of data (e.g., N×N pixel blocks, where the sizes of such blocks can be configured by register data in one or more of the modules).

In an exemplary system, a packet containing a full frame's worth of data is passed between successive pipeline stages. If a per-pixel operation is to be performed, the module can apply each pixel value—in turn—to the processing circuitry. Alternatively, the circuitry can be replicated in the ASIC to allow processing of multiple pixel values at once (e.g., corresponding to a horizontal row of pixels, or a square neighborhood of N×N pixels). The module can be configured to successively process several such chunks of pixel data from the frame. Still another implementation operates on a streamed chunk/frame of data, for example using a multiple-row rolling buffer/FIFO holding N rows of image data, permitting computation of a result from an N×M region for every pixel sequentially though the whole chunk/frame. In yet other embodiments, the hardware circuitry can be adapted to operate on a single frame of data simultaneously.

Included in a packet passed along the pipelined stages, accompanying the frame's worth of image data, can be instructions specifying whether an identified module should operate on the packet data, or simply pass it—unchanged—to the output. The packet can further include parameters that vary operation of a module—in a manner similar to the register data, but provided with the image data, rather than separately.

Such arrangement allows each chunk/frame of data to be processed according to chosen settings/algorithms without an overarching control process needing to know exactly where the chunk of data is in flight through the pipelines before it can change processing module register settings (too early and it messes up the preceding data, too late and it fails to configure in-time, especially where processing time can vary depending on the operation being performed—a very tricky score to conduct and act to choreograph).

A related packet-driven pipelined image processing architecture is shown in earlier-referenced U.S. Pat. No. 8,886,206, e.g., at FIG. 16.

Figure 8:
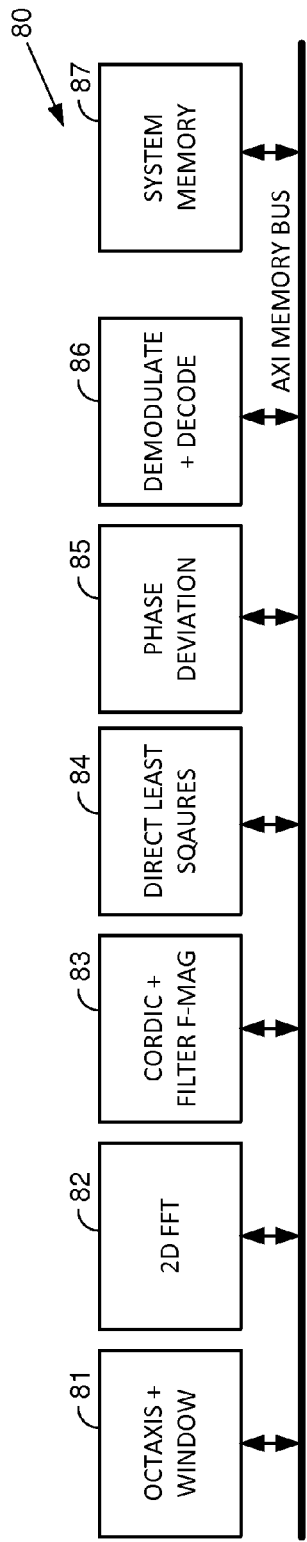
FIG. 8 shows another reconfigurable hardware arrangement, this one using ASIP modules.

FIG. 8 shows a second arrangement 80 by which a watermark system can be made reconfigurable in hardware. This arrangement employs application-specific instruction set processors (ASIPs). ASIPs can be thought of as programmable custom CPUs, each having component functional units and an instruction set tailored to a specific set of operations. Such an ASIP can also have functional units that perform fairly standard operations (for example ALUs, register-files, multipliers) and/or more complex application specific functions (high-level such as complex multiply, FFT butterfly, 2D correlation, sinc(x)) or other functional operations supporting many operations (e.g., a+b*n). Each ASIP employs Transport Triggered Architecture (TTA).

Figure 2:
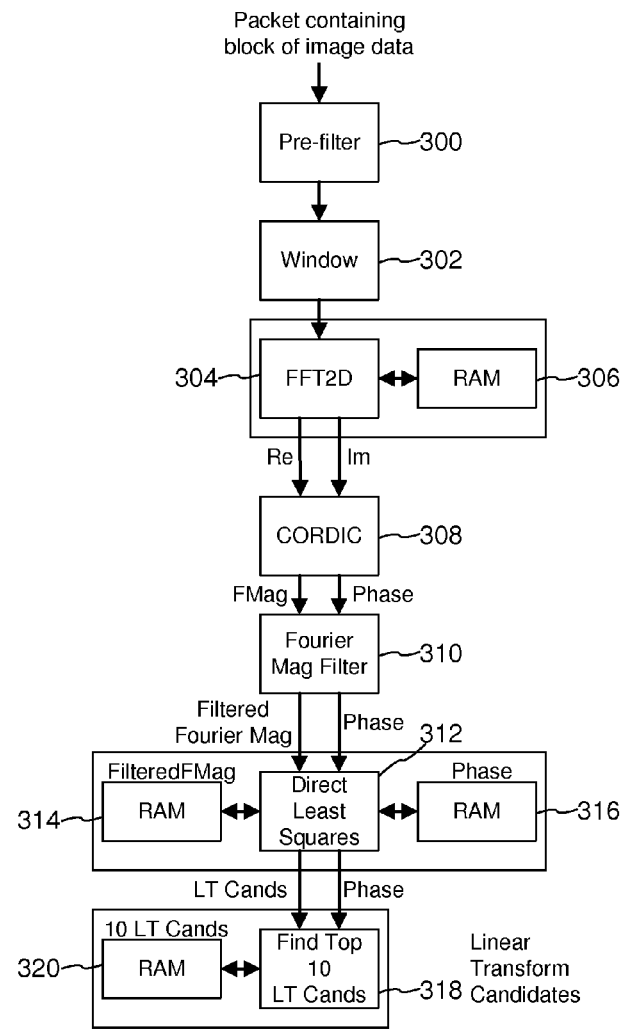
FIGS. 2 and 3 further detail the synchronization stage of the FIG. 1 system.
Figure 3:
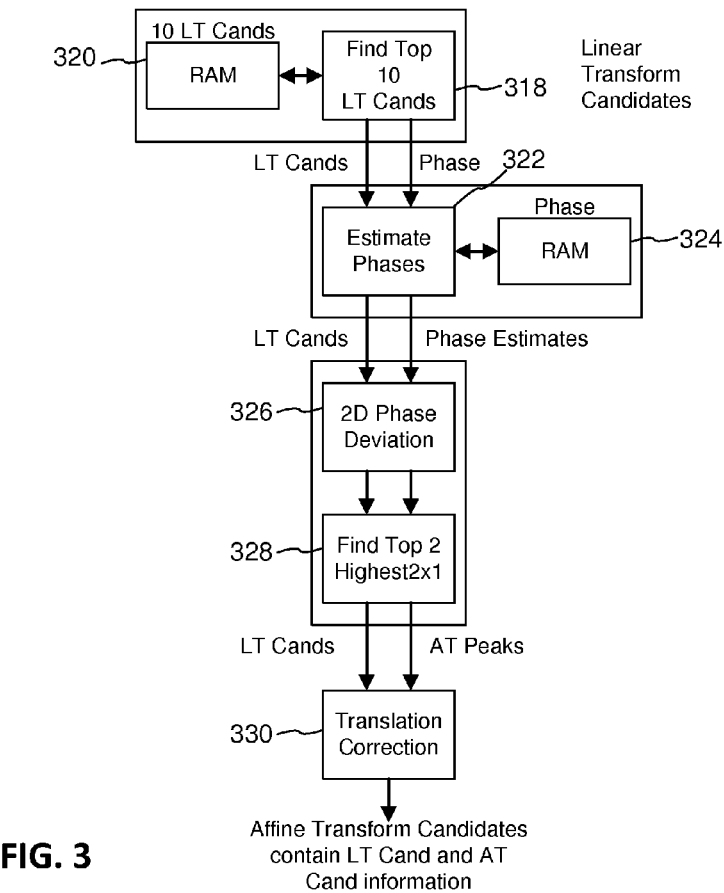
Figure 4:
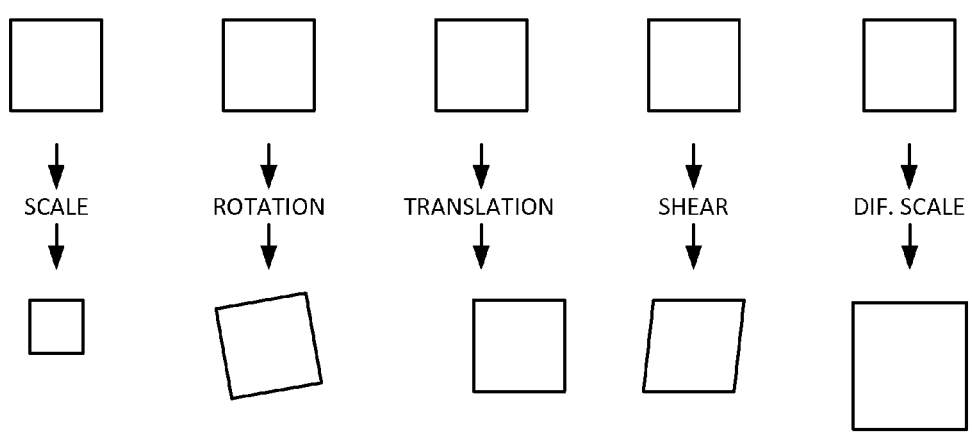
FIG. 4 illustrates scale, rotation, translation, shear, and differential scale transformations.

Referring to FIG. 8, one ASIP 81, for example, can be tailored to perform operations associated with oct-axis pre-filtering and windowing (e.g., corresponding to blocks 300 and 302 in FIG. 2). Similarly, ASIP 82 can be tailored to serve as a 2D FFT-specialized CPU (e.g., corresponding to blocks 304 and 306 in FIG. 2). ASIP 83 is specialized to the instructions needed for CORDIC and Fourier Magnitude Filtering functions (e.g., corresponding to blocks 308 and 310 in FIG. 2). ASIP 84 is customized for performance of direct least squares operations (e.g., corresponding to blocks 312-320 in FIG. 2). ASIP 85 is specialized to instructions associated with phase deviation operations (e.g., corresponding to blocks 322-332 of FIG. 2, for instance c=c+abs (a−b)). ASIP 86 is specialized to handle operations associated with the decoding functions (e.g., corresponding to blocks 64 and 65 in FIG. 5).

Operations of the ASIPs are orchestrated by data in a system memory 87. Primarily, this data controls a cross-bar arrangement of data-busses, and connection of functional units to those busses within each ASIP, by which different functional units exchange data with each other, and ultimately with other ASIPs. Such "program" data may be held locally within the individual ASIP for speed, loaded initially from main system memory.

Figure 9:
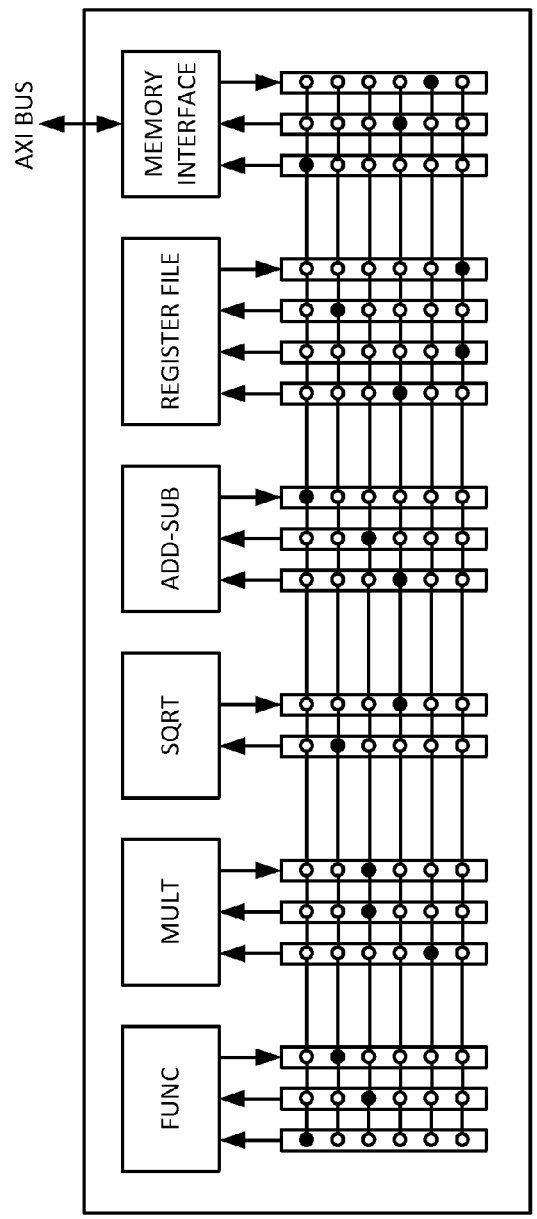
FIG. 9 further details a single illustrative ASIP module.

FIG. 9 shows functional units within an illustrative single ASIP TTA processor, including an associated cross-bar interconnect. The black dots in the cross-bar bus indicate closed circuits (connections); the white dots indicate open circuits. Thus, on the top of the cross-bar lines, an Add-Subtract module is outputting data, which is being input to a Function unit for a next operation. This same data is also being transmitted externally, via a Memory Interface unit, onto the AXI memory bus that interconnects all the ASIPs. The second of the cross-bar lines illustrates that data is being output from the Function unit, and provided as input to both a Square Root unit, and for storage in a register. Each of the other cross-bar lines is similarly used to relay data internally within the ASIP, and/or externally to other units. (While six crossbar lines, and six modules, are shown in FIG. 9, an actual implementation can naturally employ smaller, larger, and unequal numbers of such lines and modules.)

Data to be processed is fetched from system memory 87, operated upon by a sequence of processing within the ASIP, and written back to system memory. Data may be written to and read back from system memory multiple times during computation. Alternatively, an interface that sources data directly from another processing module (dedicated logic, another ASIP, a camera, or other data source) may feed directly in to the TTA architecture on a bus or bus interconnect. Likewise data may be sent out directly to another processing module as an alternative to writing results to the system memory.

System memory 87, which controls these cross-bar interconnects, can be thought of as issuing a timed sequence of on/off instructions to each cross-bar junction, in a series devised by the TCE compiler to perform a designed set of operations. In one particular embodiment, the memory 87 essentially stores of a sequence of wide data words—a next one of which is output each clock cycle. Each bit in these wide data words controls a particular cross-bar. As the words are successively output, the interconnects progress through their programmed sequences—each time redefining a pipeline arrangement by which the component stages are configured.

For most efficient, and fast, operation, the compiler strives to keep each of the component units busy. A unit should not wait because a predecessor unit is backlogged—with several operations waiting. To avoid such bottlenecks, the architecture often requires multiple instances of certain hardware units (e.g., ALUs) to assure a suitable system-wide throughput.

In such an arrangement, reconfigurability is achieved by recompiling the instructions stored in system memory 87, in accordance with different system parameters. If a red pixel value is to be multiplied by 1, instead of by 0.2126, the input to the compiler is adjusted appropriately, and the resulting output effects a change in the series of cross-bar switch operations necessary to implement such a change. Similarly, all of the other parameters noted herein can be varied by varying them in the input to the compiler, yielding revised data for the system memory 87.

The compiler is designed to accept program instructions in C and C++ as input, to define the system operations.

In an illustrative embodiment, the FIG. 8 arrangement is implemented as a system on a chip, fabricated on a common silicon substrate. The system memory 87, containing instructions that parameterize a particular piece of silicon for a particular application, can be burned into on-substrate ROM, or can be stored in a memory that can later be rewritten, e.g., an EERAM, FLASH memory, or OTP ROM configured on the chip at time of manufacturing or after initial manufacturing. (Rewriting of the system memory allows, e.g., for evolution of the watermark payload—permitting new protocols to be developed, while still supporting earlier protocols. Rewriting of the system memory also allows for improvements, such as faster algorithms, supplied as updates to the program sequences for the ASIP TTA modules.)

Tools to design ASIPs are available from commercial vendors, such as Synopsis, Inc. Open source tools are also available, most notably TTA-based co-design environment (TCE), from the Tampere University of Technology in Finland. This technology is the subject of many technical papers, including Otto, et al, Customized Exposed Datapath Soft-Core Design Flow with Compiler Support, 20th International Conference on Field Programmable Logic and Applications, August-September 2010; and Heikkinen, DSP Applications on Transport Triggered Architectures, MS Thesis, Tampere University of Technology, 2001 (both attached to, and forming part of, application 62/188,440). The artisan is presumed to be familiar with such tools.

Figure 10:
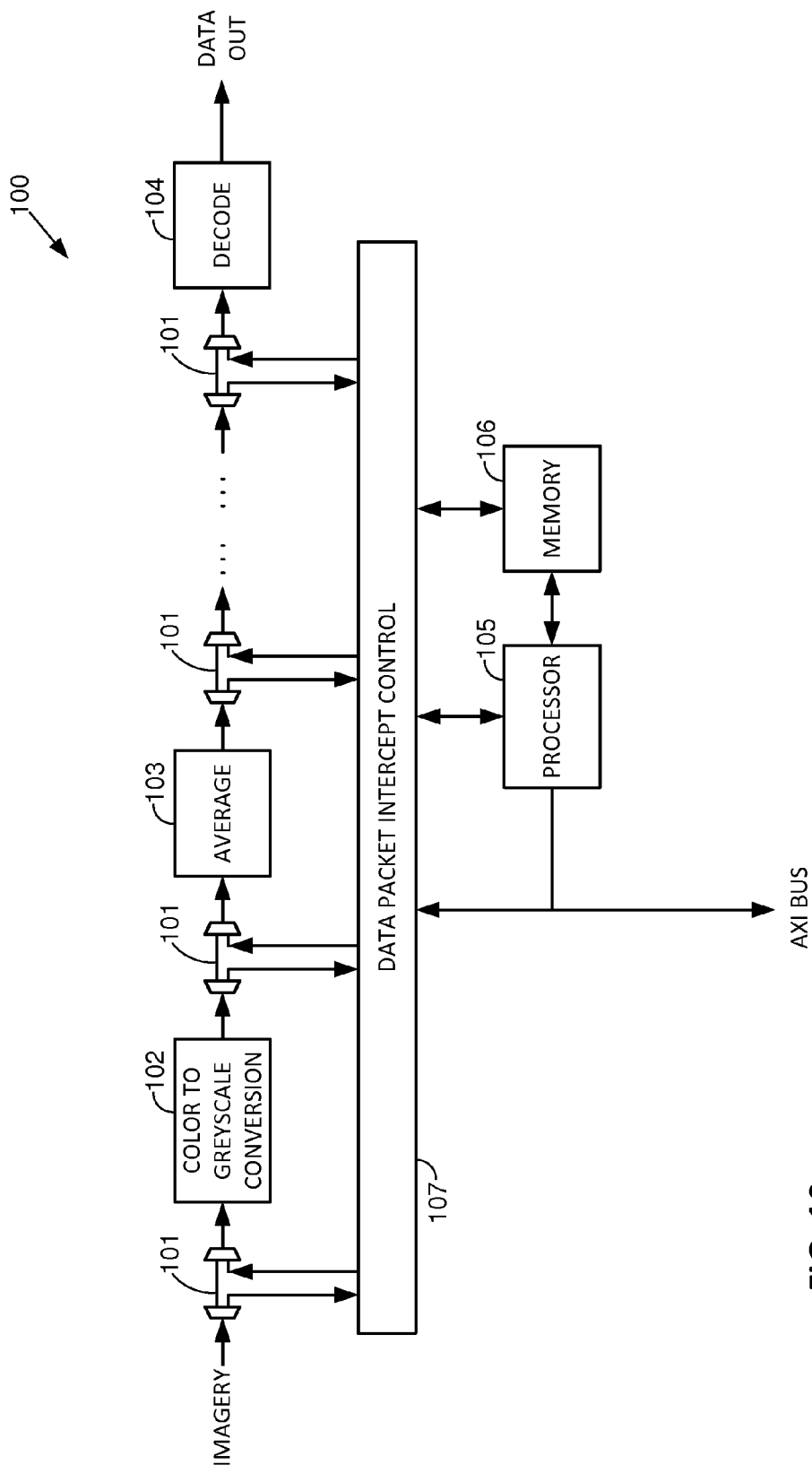
FIG. 10 shows another reconfigurable hardware arrangement, this one employing a data intercept approach.

FIG. 10 shows a third arrangement by which a watermark system can be made reconfigurable in hardware. This arrangement is similar to the FIG. 5 arrangement, in that it employs a series of pipelined circuits (e.g., ASICs), each specialized to a different part of the process. For clarity of illustration, only a few of the circuits are shown: a color to greyscale conversion module 102 (corresponding to module 51 in FIG. 5); an averaging module 103 (corresponding to module 52 in FIG. 5), and a decode module 104 (corresponding to module 65 in FIG. 5). The intervening modules are omitted.

A difference is that, interposed between at least some of the circuits, is switching circuitry 101 (e.g., built from MUX/DEMUX logic) that selectively can divert the output from one module away from the input of the next, and instead to an auxiliary processor 105. This processor (which may be a general purpose CPU, microcontroller, GPU or DSP) can perform further operations supplementary to those of the stage that just processed the signal, and then return the further-processed data to the next stage in the pipelined sequence.

For example, the color to greyscale conversion module 102 may perform the earlier-described weighted summing of red, green, and blue pixel values, and provide this greyscale data at its output. Processor 105 can cause a data packet intercept control logic circuit 107 to take this greyscale output, and provide it to the processor 105 for further processing. The processor may, e.g., perform the above-described contrast adjustment on the greyscale data, varying the pixel values to range from 0 to 255. The processor can then instruct the logic circuit 107 to return this further-processed data to the input of the next stage in the sequence, i.e., the averaging module 103.

Alternatively, the processor can instruct logic circuit 107 to reintroduce this further processed data to a later stage in the pipeline, e.g., skipping the averaging module 103, and re-inserting it at the output of the averaging module.

In such arrangement, reconfigurability is achieved by programming instructions stored in memory 106, which specify which module outputs are to be further processed by the auxiliary processor 105, and the particular further processing that the processor is to perform on such data.

From the foregoing, it will be recognized that the present technology provides a variety of advantages over traditional software implementations. These can include speed, lower power consumption, and better resistance to (and recovery from) attack.

Moreover, the reconfigurability provided by the present technology enables in-the-field or at-production changes to the design, to revise for changes to the signal being read from watermarked objects. These changes may be due to various causes, such as product production changes (packaging materials, inks, or watermark coding methods changing after the system has been installed), workflow changes in how the system is used or installed, lighting changes in the environment, and changes responsive to system attacks.

The costs (e.g., non-recoverable engineering expenses) for a custom hardware watermark chip, e.g., for a point of sale system, have been too high to be commercially practical. The reconfigurability afforded by the present technology allows production of a standard product (which may be termed an Application Specific Standard Product) that can be used in many different products, all with different design requirements. The same chip may be used in applications as diverse as a POS terminal, and an industrial control system (e.g., packaging production-line control or automated warehousing robotic drones, as both might be used by Amazon). Such a standard chip may be used in systems with very different camera implementations (ruggedized, waterproof high temperature, though to ultra-lightweight for airborne drone), very different spectral illumination characteristics (e.g., high-power strobe or laser/LED; ambient sunlight via warehouse skylights; high-pressure mercury vapor lighting in a warehouse; infrared/ultraviolet for detection of security markings; etc.), and with a great variety of watermark message structures, formats and protocols.

Thus, two identical hardware chips may be found in very different contexts, e.g., one in an Amazon warehouse, and another in a supermarket point of sale scanner; the former reading watermarks undecodable by the latter, and vice versa. Similarly, a single hardware chip serving a particular application may be hardware-reconfigured, in the midst of its operational lifetime (e.g., months or years later), to read watermarks that would have been undecodable as that hardware was originally put into service.

Brief Review

A few of the inventive aspects of the present technology are summarized below:

One aspect is a watermark decoder that includes a synchronization portion and a decoding portion. At least one of these portions is implemented using hardware circuitry that was designed and fabricated to form part of a watermark decoder, rather than serve as a general purpose processor. Such portion includes first means for re-parameterizing one or more facets of its operation to permit customization of such portion, either at a time when the decoder is built, or after it has been placed into service.

The first means can be of various forms, including: (a) a hardware register that is writable by register control circuitry; (b) an ASIP processor, a cross-bar interconnect, and a memory, where the memory is controlled to issue a timed sequence of on/off instructions to plural cross-bar junctions in the cross-bar interconnect, and (c) data packet intercept control logic that selectively intercepts data output from one module in a series of pipelined modules, and passes the intercepted data to a processor for additional processing that yields a processed data packet, before re-introducing the processed data packet to an input of a subsequent one of the plural pipelined modules.

The watermark decoder can further include an image standardization portion that likewise is implemented using hardware circuitry that was designed and fabricated to form part of a watermark decoder, rather than serve as a general purpose processor. This image standardization portion includes second means for re-parameterizing one or more facets of its operation to permit customization of such portion, either at a time when the decoder is built, or after it has been placed into service. This second means can include one or more of the just-noted (a), (b) and (c). Together, the watermark decoder can include two or more of (a)-(c) (i.e., (a)+(b), or (a)+(c), or (b)+(c)).

The first and/or second means can include means for re-parameterizing one or more facets of the decoder's operation by changing at least one of the following parameters: image size, watermark block size, expected illumination, forward error correction coding algorithm, a number of trial seeds for iterative-based search methods, iteration counts, and watermark reference signals.

In another aspect, there may be two of the just-detailed watermark decoders, where a first of the watermark decoders is incorporated into a first device selected from the list consisting of: a point of sale scanner for a supermarket checkout, a handheld scanner, a smartphone watermark detector, and an age verification terminal, and a second of the watermark decoders is incorporated into a second device selected from the same list. The second device can be different than the first device.

In accordance with a further aspect of the technology, a method is provided that includes obtaining first and second identical watermark decoder chips, where each of the chips includes a synchronization portion and a decoding portion, and these chips have been designed and fabricated to form part of a watermark decoder, rather than to serve in a general purpose processing capability. The method includes parameterizing the first watermark decoder chip to serve in a first application, and parameterizing the second watermark decoder chip to serve in a second application. At least one of the following parameters is different between the first and second applications: image size, watermark block size, expected illumination, forward error correction coding algorithm, a number of trial seeds for iterative-based search methods, iteration counts, and watermark reference signals.

In such arrangement, the first application can be selected from the list consisting of: a point of sale scanner for a supermarket checkout, a handheld scanner, a smartphone watermark detector, and an age verification terminal. The second application may also be selected from such list.

In accordance with another aspect of the technology, a method employs a watermark decoder chip that includes a synchronization portion and a decoding portion, and was designed and fabricated to form part of a watermark decoder, rather than to serve in a general purpose processing capability. Such method includes parameterizing the watermark decoder chip with first parameters to enable the chip to decode watermarks of a first type and, several months later, parameterizing the watermark decoder chip with second parameters to enable the chip to decode watermarks of a second type different than the first type. In such method, watermarks of the second type would have been undecodable when the watermark decoder chip was parameterized with the first parameters. (The first and second parameters may differ concerning at least one of: image size, watermark block size, expected illumination, forward error correction coding algorithm, a number of trial seeds for iterative-based search methods, iteration counts, and watermark reference signals.)

Concluding Remarks

Having described and illustrated the features of our technology with reference to exemplary embodiments, it will be recognized that the technology is not so limited.

For example, while FIGS. 5, 8 and 10 show hardware arrangements that are generally homogeneous in their component units, in actual practice some diversity may be employed. For example, one or more ASIPs may be used in combination with one or more modules of ASIC circuitry that are configured by register data. Similarly, register-configured modules can be used in the FIG. 10 embodiment. Still further, the auxiliary processor 105 in FIG. 10 can be an ASIP. Moreover, an auxiliary processor and data intercept logic can be included in the arrangements of FIGS. 5 and 8—to perform certain processing tasks, exchanging data with ASIP- or register-based configurable stages—as needed.

Moreover, each of the FIGS. 5, 8 and 10 arrangements can, themselves, employ programmable logic, such as an FPGA.

One such implementation follows the approach of FIGS. 8 and 9, with certain of the FIG. 9 TTA processor components implemented in ASIC form (e.g., the interconnect/bus arrangement, and certain modules whose functions are of general utility and unlikely to be changed, such as the ALU and register file stages), and the remaining computation modules implemented in FPGA form.

Another particular approach employs the FIG. 8 architecture, with certain stages reconfigurable in TTA fashion (per FIG. 9), and others reconfigurable in register fashion (per FIG. 5). Thus, for example, modules 51-56 and 59 can be implemented with TTA reconfigurability, and modules 57, 58, and 60-65 can be implemented with register-based reconfigurability.

The artisan will recognize that there are several different approaches to extraction of watermark data. For example, while the illustrative embodiment utilized a least squares-based approach to synchronization, other arrangements can be used in other embodiments. For example, some watermark systems employ Fourier Mellin-based approaches to determining synchronization. Likewise for other aspects of the illustrative system.

Although the technology is illustrated in the context of watermarking systems, it will be recognized that the principles thereof also lend themselves to design of other reconfigurable systems, e.g., for different barcode reading applications. For example, a single piece of silicon can be configured to serve as a QR code reader, a Code 39 reader, an EAN 13 reader, etc. Similarly, such a single silicon chip can be reconfigured for use with either white light illumination, or LED—such as red.

Still further, a reconfigurable arrangement (or part thereof) as detailed above can be used in a system that performs a diversity of image recognition tasks, such as decoding watermarks and barcodes, and performing optical character recognition. A reconfigurable Viterbi decoder, for example, can be parameterized for use both in extracting payloads from watermarks and barcodes, and text from visible glyphs. So, too, can be a module that discerns and characterizes an affine (or perspective) distortion, in imagery that depicts a barcode, or watermark, or text.

Although not depicted in the figures, a further item of reconfigurable hardware is silicon that produces dynamic deblurring. A suitable deconvolution kernel can be estimated by such hardware using motion sensor data (e.g., accelerometer, gyroscope, and/or magnetometer data) from a MEMS sensor, which can be accessed by the silicon hardware, e.g., through one or more registers.

Image fingerprinting, and matching of image fingerprints with reference fingerprint data, are other operations that can be implemented in reconfigurable fashion in accordance with teachings of the present technology.

Although the emphasis has been on image processing, it will be recognized that the same principles are equally applicable to reconfigurable hardware useful with audio processing, e.g., audio watermark encoding and decoding, audio fingerprint extraction/matching, speech recognition, etc.

Other patent documents by the present applicant detail additional watermarking technology that can be used in conjunction with the present arrangements (and into which the present arrangements can be incorporated). Examples include the following patents, publications and co-pending applications: Ser. No. 14/520,160, filed Oct. 21, 2014, and 62/102,547, filed Jan. 12, 2015 (e.g., re phase estimation); 62/193,479, filed Jul. 16, 2015 (e.g., re detection including weighted demodulation and dealing with perspective distortion; copy attached); U.S. Pat. No. 7,072,487 (e.g., re adapting color vectors employed by a watermark detector); U.S. Pat. No. 7,231,061 (e.g., re adaptive prediction filtering, including oct-axis); U.S. Pat. No. 7,076,082 (e.g., re lookup-based implementation of oct-axis filtering); 20120129574 (e.g., re watermark detection in adverse lighting using adaptive signal detection); U.S. Pat. No. 6,988,202 (e.g., re pre-filtering to increase watermark signal-to-noise ratio); U.S. Pat. Nos. 7,978,875, 7,574,014, 7,013,021 and 6,442,284 (e.g., re identifying areas of imagery most likely to have decodable watermark data); U.S. Pat. No. 6,516,079 (e.g., re setting detection thresholds to control stages of a watermark detector); U.S. Pat. No. 8,891,811 (e.g., re block traversal and selection strategy); 20120214515 (e.g., re audio watermarking); Ser. No. 14/725,399, filed May 29, 2015 (e.g., re sparse embedding arrangements); Ser. No. 14/724,729, filed May 28, 2015 (e.g., re different modulation techniques); and U.S. Pat. No. 6,975,745 (e.g., re refining estimates based on local block correlations; phase locking). Each of these documents reveals various fixed parameters that can be made variable through use of the presently-detailed technology, to thereby permit a single chip to serve multiple diverse applications.

To review an exemplary ASIC design process, one or more modules (e.g., selected from modules 51-65, above, such as the color to greyscale conversion module) are first implemented using a general purpose computer, using software such as Matlab (from Mathworks, Inc.). A tool such as HDL Coder (also available from MathWorks) is next employed to convert the MatLab model to VHDL (an IEEE standard, and one of the most common hardware design languages). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part on a physical silicon substrate. (Suitable contractors include TSMC, Global Foundries, and ON Semiconductors.)

All of the modules detailed herein can be implemented in such fashion.

ASIC implementation can similarly start with a C, or C++, software description of the algorithm. So-called "C-to-Silicon" tools, can then be used. Such tools are available from Calypto Design Systems (e.g., Catapult), Synopsys (e.g., Synphony C Compiler), and Cadence Design Systems (e.g., Cynthesizer). Again, the resulting HDL output (e.g., Verilog) is used to generate a netlist and layout data for silicon fabrication.

Instead of going to silicon, the HDL output (e.g., RTL) can additionally/alternatively be used to configure FPGAs and other such logic. One family of such logic that is particularly suitable to image processing is available from Flex-Logix, e.g., the EFLX-2.5K all-logic FPGA core in TSMC 28 nm High Performance Mobile (HPM) process technology.

Rather than starting with a Matlab or C description of an algorithm, the open source programming language Halide (halide-lang<dot>org) can be used to define the algorithm. The Halide compiler is adapted to provide output that targets popular processor architectures, including ARM, x86, and various GPUs, exploiting their respective capabilities for parallel processing, Single Instruction Multiple Data, and cache/memory efficiencies. More particularly, the compiler uses profiles containing knowledge of hardware capabilities, and code-specific selection of those capabilities, such that the compiled code should be optimally fast in a given hardware environment. Halide is thus suitable for porting an algorithmic description of a module to any form of hardware implementation—including those detailed above. (The Halide compiler can provide output in the Verilog hardware description language.)

The artisan will recognize that a variety of optimizations can be employed to reduce the gate count and power consumption of the resulting circuitry. For example, gate count and power consumption can be reduced by minimizing the use of (or size of) multipliers, division, logs, and exponentials. Lookup tables can sometimes be used in lieu of such operations. Approximations and mathematical equivalents may also be used. Further economies can be achieved by tuning the size of numeric types (the number of bits used, and their encoding format) to minimize the number of bits for each value within a calculation. For example, if a variable is known to be in the range of 0-10, a four bit representation may be used, instead of a 32-bit integer. Similarly, full floating point expressions are sometimes overkill for non-integer values. Etc.

Software instructions for implementing identified software-programmed functionality can be authored by artisans without undue experimentation from the descriptions provided herein, e.g., written in C, C++, Halide, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative apparatus, the methodology performed by such apparatus is likewise within the scope of the present technology. Likewise, tangible computer readable media containing instructions for configuring hardware as detailed herein is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

The invention claimed is:

1. A watermark decoder comprising:
    a synchronization portion; and
    a decoding portion;
    at least one of said portions being implemented using hardware circuitry that was designed and fabricated to form part of a watermark decoder, said at least one portion including first means for re-parameterizing one or more facets of its operation to permit customization of said portion, either at a time when the decoder is built, or after it has been placed into service, said first means comprising an application-specific instruction set processor, a cross-bar interconnect, and a memory, the memory being controlled to issue a timed sequence of on/off instructions to plural cross-bar junctions in said cross-bar interconnect.

2. The watermark decoder of claim 1 in which said first means comprises a hardware register that is writable by register control circuitry.

3. The watermark decoder of claim 1 wherein said at least one portion includes first means for re-parameterizing one or more facets of its operation to permit customization of said portion, at a time when the decoder is built, said first means including ROM on a common substrate with said portion, said ROM having been burned to define said customization.

4. The watermark decoder of claim 1 that further includes an image standardization portion, said image standardization portion being implemented using hardware circuitry that was designed and fabricated to form part of a watermark decoder, said image standardization portion including second means for re-parameterizing one or more facets of its operation to permit customization of said portion, either at a time when the decoder is built, or after it has been placed into service.

5. The method of claim 1 wherein said first means comprises means for re-parameterizing one or more facets of its operation by changing at least one of the following parameters: image size, watermark block size, expected illumination, forward error correction coding algorithm, a number of trial seeds for iterative-based search methods, iteration counts, and watermark reference signals.

6. Apparatus including two watermark decoders according to claim 1, wherein a first of said watermark decoders is incorporated into a first device selected from the list consisting of: a point of sale scanner for a supermarket checkout, a handheld scanner, a smartphone watermark detector, and an age verification terminal, and a second of said watermark decoders is incorporated into a second device selected from said list, wherein the second device is different than the first device.

7. The watermark decoder of claim 1 wherein said first means is for re-parameterizing said one or more facets of its operation to permit customization of said portion at a time when the decoder is built.

8. The watermark decoder of claim 1 wherein said first means is for re-parameterizing said one or more facets of its operation to permit customization of said portion after it has been placed into service.

9. The watermark decoder of claim 1 wherein said first means forms part of the synchronization portion.

10. The watermark decoder of claim 1 wherein said first means forms part of the decoding portion.

11. A watermark decoder comprising:
a synchronization portion; and
a decoding portion;
at least one of said portions being implemented using hardware circuitry that was designed and fabricated to form part of a watermark decoder, said at least one portion including first means for re-parameterizing one or more facets of its operation to permit customization of said portion, either at a time when the decoder is built, or after it has been placed into service;
the watermark decoder further including a series of pipelined modules, wherein the first means includes data packet intercept control logic that selectively intercepts data output from one pipelined module in said series, and passes the intercepted data to a processor for additional processing that yields a processed data packet, before re-introducing said processed data packet to an input of a subsequent one of said plural pipelined modules.

12. The watermark decoder of claim 11 in which said data packet intercept control logic comprises MUX/DEMUX logic circuitry.

13. A watermark decoder comprising:
a synchronization portion; and
a decoding portion;
at least one of said portions being implemented using hardware circuitry that was designed and fabricated to form part of a watermark decoder, said at least one portion including first means for re-parameterizing one or more facets of its operation to permit customization of said portion, either at a time when the decoder is built, or after it has been placed into service;
the watermark decoder further including an image standardization portion, said image standardization portion being implemented using hardware circuitry that was designed and fabricated to form part of a watermark decoder, said image standardization portion including second means for re-parameterizing one or more facets of its operation to permit customization of said portion, either at a time when the decoder is built, or after it has been placed into service;
the watermark decoder also including a series of pipelined modules, wherein:
the first means comprises at least one of:
(a) a hardware register that is writable by register control circuitry;
(b) an application-specific instruction set processor, a cross-bar interconnect, and a memory, the memory being controlled to issue a timed sequence of on/off instructions to plural cross-bar junctions in said cross-bar interconnect; and
(c) data packet intercept control logic that selectively intercepts data output from one pipelined module in said series, and passes the intercepted data to a processor for additional processing that yields a processed data packet, before re-introducing said processed data packet to an input of a subsequent one of said plural pipelined modules; and
the second means comprises at least one of the foregoing (a), (b) or (c); and
the watermark decoder includes: at least (a) and (b), or (a) and (c), or (b) and (c).

14. A method comprising the acts:
obtaining first and second identical watermark decoder chips, said chips each including a synchronization portion and a decoding portion, said chips each having been designed and fabricated to form part of a watermark decoder;
parameterizing the first watermark decoder chip to serve in a first application; and
parameterizing the second watermark decoder chip to serve in a second application;
wherein at least one of the following parameters is different between the first and second applications: image size, watermark block size, expected illumination, forward error correction coding algorithm, a number of trial seeds for iterative-based search methods, iteration counts, and watermark reference signals.

15. The method of claim 14 in which the first application is selected from the list consisting of: a point of sale scanner for a supermarket checkout, a handheld scanner, a smartphone watermark detector, and an age verification terminal.

16. The method of claim 15 in which the second application is also selected from said list.

17. A method employing a watermark decoder chip, said chip including a synchronization portion and a decoding portion, said chip having been designed and fabricated to form part of a watermark decoder, the method comprising the acts;
(a) parameterizing said watermark decoder chip with first parameters to enable the chip to decode watermarks of a first type; and (b) plural months after performing act (a), parameterizing said watermark decoder chip with second parameters to enable the chip to decode watermarks of a second type different than the first type;

wherein watermarks of said second type would have been undecodable when the watermark decoder chip was parameterized with said first parameters.

18. The method of claim 17 in which said first and second parameters are different concerning at least one of: image size, watermark block size, expected illumination, forward error correction coding algorithm, a number of trial seeds for iterative-based search methods, iteration counts, and watermark reference signals.

19. A watermark decoder comprising:
an image standardization portion;
a synchronization portion; and
a decoding portion;
at least one of said synchronization or decoding portion being implemented using hardware circuitry that was designed and fabricated to form part of a watermark decoder, said at least one synchronization or decoding portion including first means for re-parameterizing one or more facets of its operation to permit customization of said portion, either at a time when the decoder is built, or after it has been placed into service;
at least said image standardization portion being implemented using hardware circuitry that was designed and fabricated to form part of a watermark decoder, said image standardization portion including second means for re-parameterizing one or more facets of its operation to permit customization of said portion, either at a time when the decoder is built, or after it has been placed into service.

20. The watermark decoder of claim 19 in which said second means comprises an ASIP processor, a cross-bar interconnect, and a memory, the memory being controlled to issue a timed sequence of on/off instructions to plural cross-bar junctions in said cross-bar interconnect.

21. The watermark decoder of claim 19 in which said second means comprises a hardware register that is writable by register control circuitry.

22. The watermark decoder of claim 19 wherein said image standardization portion includes a ROM that has been burned to define said customization.

23. The method of claim 19 wherein said second means comprises means for re-parameterizing one or more facets of its operation by changing at least one of the following parameters: image size, watermark block size, expected illumination, forward error correction coding algorithm, a number of trial seeds for iterative-based search methods, iteration counts, and watermark reference signals.

24. The watermark decoder of claim 19 wherein said second means is for re-parameterizing said one or more facets of its operation to permit customization of said portion at a time when the decoder is built.

25. The watermark decoder of claim 19 wherein said second means is for re-parameterizing said one or more facets of its operation to permit customization of said portion after it has been placed into service.

\* \* \* \* \*